United States Patent
Iverson et al.

(10) Patent No.: US 7,671,736 B2
(45) Date of Patent: Mar. 2, 2010

(54) WIRELESS ELECTROMAGNETIC PARASITIC POWER TRANSFER

(75) Inventors: Rod Iverson, Tucson, AZ (US); Edward J. McKernan, Tucson, AZ (US); Michael Boost, Tucson, AZ (US); Forrest Seitz, Tuscon, AZ (US); Harvey Blair, Tucson, AZ (US)

(73) Assignee: Securaplane Technologies Inc., Tucson, AZ (US)

( * ) Notice: Subject to any disclaimer, the term of this patent is extended or adjusted under 35 U.S.C. 154(b) by 309 days.

(21) Appl. No.: 11/768,110

(22) Filed: Jun. 25, 2007

(65) Prior Publication Data

US 2008/0036588 A1 Feb. 14, 2008

Related U.S. Application Data

(60) Provisional application No. 60/815,965, filed on Jun. 23, 2006.

(51) Int. Cl.
*G08B 1/08* (2006.01)

(52) U.S. Cl. .............................. 340/539.22; 340/539.1; 340/825.69; 340/825.72

(58) Field of Classification Search .............. 340/539.1, 340/539.16, 539.17, 572.1, 825.69, 825.72, 340/10.1, 10.3, 539.22; 455/41.2, 41.1; 235/375, 235/376, 380, 383, 487, 492
See application file for complete search history.

(56) References Cited

U.S. PATENT DOCUMENTS

| 5,426,694 | A | 6/1995 | Hebert |
| 6,275,681 | B1 | 8/2001 | Vega et al. |
| 6,362,738 | B1 * | 3/2002 | Vega ....................... 340/572.1 |
| 7,256,695 | B2 * | 8/2007 | Hamel et al. ............. 340/572.1 |
| 7,388,497 | B1 * | 6/2008 | Corbett et al. ........... 340/572.4 |
| 2008/0194200 | A1 * | 8/2008 | Keen et al. ................. 455/41.1 |

OTHER PUBLICATIONS

Patent Cooperation Treaty, International Search Report, Dec. 12, 2007, 2 pages.

* cited by examiner

*Primary Examiner*—Hung T. Nguyen
(74) *Attorney, Agent, or Firm*—Wilmer Cutler Pickering Hale & Dorr LLP

(57) ABSTRACT

A wireless system including an antenna, an electrical energy storage unit connected to the antenna, the energy storage unit receiving power via electromagnetic coupling of the antenna with an RF field generated by a master unit, and an electronics package. The electronics package is powered by the energy storage unit, and it includes a sensor, a processor that is capable of acquiring data from the sensor, and a transmitter connected to the processor and to the antenna, wherein the energy storage unit is capable of storing sufficient energy to supply power for the processor to format a message containing data acquired from the sensor and for the transmitter to transmit the message wirelessly via the antenna.

19 Claims, 3 Drawing Sheets

WIRELESS ELECTROMAGNETIC PARASITIC POWER TRANSFER

This application claims the benefit of U.S. Provisional Application No. 60/815,965, filed Jun. 23, 2006, which is incorporated herein by reference.

TECHNICAL FIELD

This invention relates to wireless transmission of power to a data gathering device equipped with a power receiver, power storage device, and a data transmitter.

BACKGROUND OF THE INVENTION

Wireless devices are usually powered by batteries. Since batteries have a finite life, they need to be replaced from time to time. But replacing batteries in wireless devices that are hard to access can be difficult and costly. Furthermore, batteries can fail at inopportune, unpredictable times. In applications where temporary outages of remote devices are not acceptable, batteries must be replaced preventively on a regular basis. The problem is especially troublesome for remote RF receivers because they must be on continuously in order to be able to receive a transmission. When the remote device includes a transmitter, the need to preserve battery life can often constrain the way in which the device is used. For example, the interval between transmissions may be lengthened, and transmission power may be lowered. Although this can prolong battery life, it can reduce the utility of the remote wireless device.

SUMMARY OF THE INVENTION

The described embodiment provides power to a wireless remote unit without the need for brushes, slip rings, or other physical connections. Power is transferred via electromagnetic parasitic transfer to a remote unit that is equipped with circuits for sensing, acquiring, storing, and transmitting data that is gathered at the remote unit.

In general, in one aspect the invention features a wireless system that, when in operation, is coupled to an RF field transmitted by a power-emitting master unit. The system comprises: an antenna; an electrical energy storage unit connected to the antenna, wherein the energy storage unit receives energy via electromagnetic coupling of the antenna with the RF field, at least a part of the received energy being stored in the energy storage unit; and an electronics package powered solely by the received energy, the electronics package including a sensor, a processor that is capable of acquiring data from the sensor, and a transmitter connected to the processor and to the antenna, wherein the energy storage unit is capable of storing sufficient received energy to supply power for the transmitter to transmit a message wirelessly via the antenna, the message containing data acquired by the processor from the sensor.

Other embodiments include one or more of the following features. The wireless system's energy storage unit is capable of storing sufficient energy to further power the processor to perform at least one of the functions of acquiring data from the sensor, formatting a message containing data acquired from the sensor, and shutting the processor down. The sensor is an analog sensor and acquiring the data from the sensor includes analog to digital conversion of the data. The processor includes instructions in firmware, the instructions implementing a finite state machine when executed on the processor. The finite state machine includes a data acquisition state, and a data transmission state. The state machine further includes at least one of an RF detection state, a message formatting state, and a system shut-down state. The instructions executing on the processor cause the finite state machine to enter the data acquisition state when a level of RF activity in the antenna exceeds a predetermined power-on level. The instructions cause the finite state machine to exit the data acquisition state when a level of RF activity in the antenna falls below a predetermined power-off level. The wireless system is capable of moving along a path, the path being constrained such that the RF field strength is greater than a threshold RF field strength over substantially all of the path, the threshold RF field strength being determined in part by one or more antenna specifications and by power requirements of the electronics package. The power-emitting master unit includes an elongated antenna for generating the RF field and the path is a straight line path, the elongated antenna having a length approximately equal to the length of the straight line path. The transmitter uses at least one of on-off keying modulation and frequency modulation. The wireless system further includes a receiver connected to the processor, the receiver being powered by the energy storage unit, the receiver being capable of receiving RF transmitted instructions for execution on the processor.

In general, in another aspect, the invention features a system including a master unit having a master unit antenna and a master unit electronics package, the master unit electronics package capable of generating an RF field via the master unit antenna; and a wireless system as described above, the wireless system being electromagnetically coupled to the RF field generated by the master unit via the master unit antenna. In some embodiments, the master electronics package includes a master unit transmitter for transmitting RF via the master antenna and for powering the wireless unit, and a receiver for receiving transmissions from the wireless unit.

In general, in yet another aspect, the invention features methods for gathering data from a wireless system using the systems described above.

The details of one or more embodiments of the invention are set forth in the accompanying drawings and the description below. Other features, objects, and advantages of the invention will be apparent from the description and drawings, and from the claims.

DETAILED DESCRIPTION

The described embodiment is a system for transmitting power via RF parasitic power transfer from a transmitting coil connected to a master unit to a receiving coil connected to a wireless remote unit. The master unit is powered by an external source, but the remote unit has no source of power other than what it receives via electromagnetic coupling with the master unit. The remote unit includes a sensor for measuring data of interest, a processor in communication with the sensor for controlling the sensor, formatting the message, and controlling data transmission, and a transmitter for sending the acquired data back to the master unit or to another receiving unit.

Figure 1:
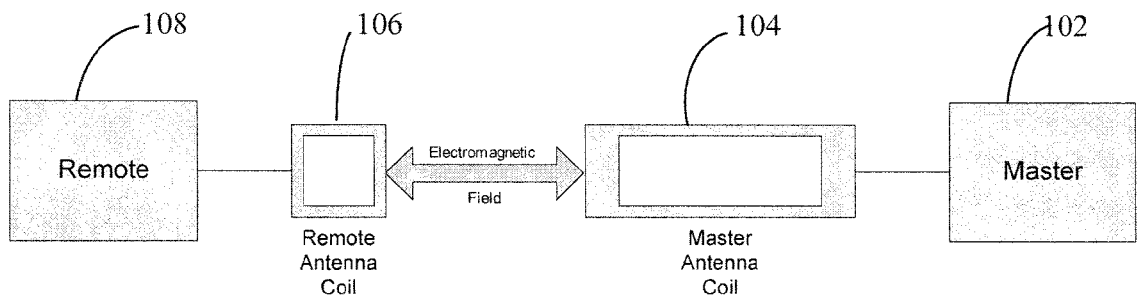
FIG. 1 is a block diagram of system incorporating wireless electromagnetic parasitic power transfer from a master unit to a remote unit.

FIG. 1 is a block diagram of the described embodiment. Master unit 102 is connected to master antenna coil 104, which is electromagnetically coupled to remote antenna coil 106. Remote antenna coil 106 provides power and connectivity for remote unit 108. The amount of power that can be transferred electromagnetically depends on the distance between master antenna coil 104 and remote antenna coil 106, falling off steeply with increasing distance. For applications in which the remote unit can move with respect to the master unit, the motion is constrained so that over the allowed range of motion the inter-coil distance does not exceed the distance at which the power coupling falls below a preset threshold. The threshold is determined by the amount of power required to drive the circuits of the remote unit, as well as by data transmission considerations. Other factors that affect the amount of coupled power include: the field coupling medium; design features of the coils, such as their shape and the number of windings; the directivity or boresighting of the antenna; and the amount of power applied to the transmitting coil.

Figure 2:
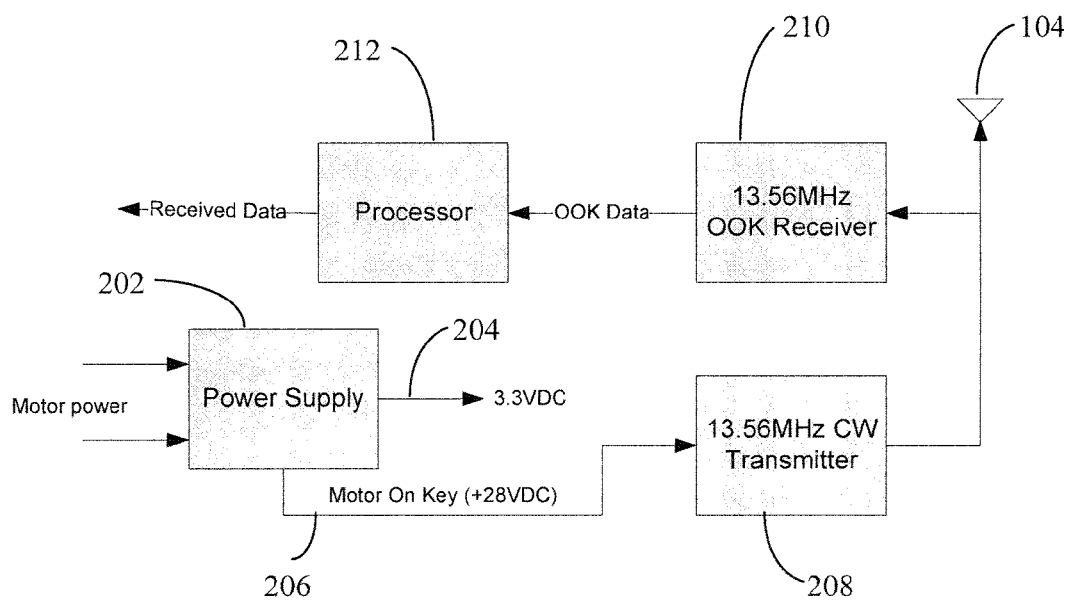
FIG. 2 is a block diagram showing the components of the master unit.

FIG. 2 shows the components of master unit 102. The unit is powered by power supply 202 which receives power from an external source. Power supply 202 supplies power to a device (not shown) that includes the moving components which require monitoring, and on which remote unit 108 is mounted. Power supply 202 has a low voltage tap 204 that supplies power to the other components of the mater unit. It is also connected via line 206 to RF transmitter 208. When power is sent to power supply 202 to turn on the device, the tap voltage rises to the "device on" voltage, and transmitter 208 interprets this as a signal to turn on RF transmission for transmitting power via electromagnetic coupling from antenna 104. In the described embodiment, transmitter 208 is a 13.56 MHz continuous wave (CW) transmitter and transmits about 1 watt of RF.

Master unit 102 also includes circuitry for receiving and processing transmissions from remote unit 108. The transmissions are picked up by antenna 104, and converted into digital form by receiver 210, e.g., a 13.56 MHz On-Off Key (OOK) receiver. Receiver 210 sends the decoded OOK data on to master unit processor 212, which packages and manipulates the received data for forwarding on to an external computer for further processing, storing and outputting. As described below in connection with FIG. 4, in a given cycle, master unit 102 first transmits power to remote unit 108 and then, later in the cycle, receives data transmitted back to it from remote unit 108.

Figure 3:
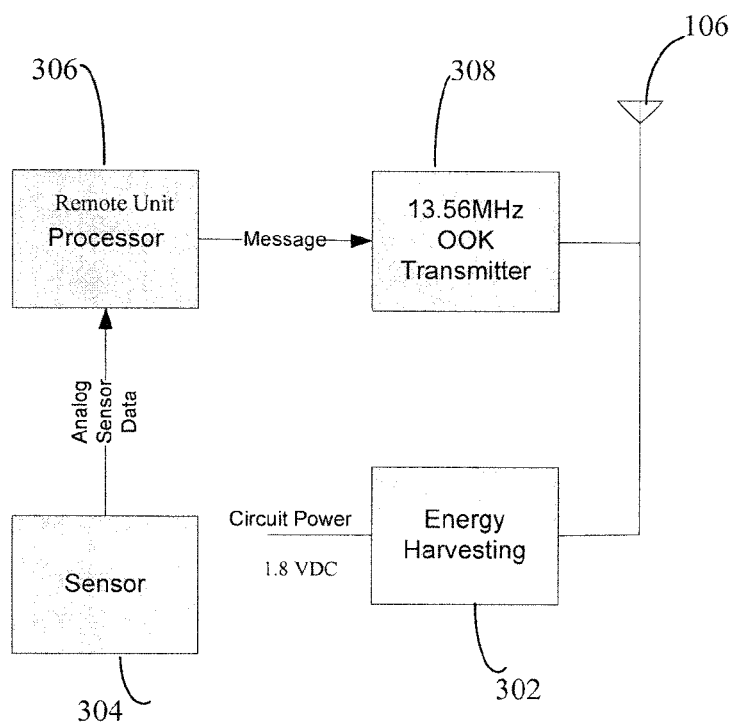
FIG. 3 is a block diagram showing the components of the remote unit.

FIG. 3 is a block diagram showing the components of remote unit 108. There is an energy harvesting unit 302 which is coupled to remote antenna coil 106. In the described embodiment, remote unit antenna has a coupling efficiency of about 10% to the master antenna, which enables it to couple about 0.1 watt when the master antenna is transmitting 1 watt of RF. Energy harvesting unit 302 includes capacitors that store the energy electromagnetically transferred from master antenna coil 104 by remote antenna coil 106. It supplies 1.8 VDC power to all the electronic components of the remote unit. When enough energy has been harvested to power the remote unit's circuits, analog sensor unit 304 starts performing its sensing function and generating a data signal. The data relates to monitoring effects or phenomena occurring within or in the vicinity of the remote unit, and that are not easily detectable or measurable from any other location. Sensor 304 is connected to remote unit processor 306, which receives the data signal generated by sensor 304, formats the data, packages it into a suitable message and forwards it to remote unit transmitter 308. In the described embodiment, transmitter 308 is a 13.56 MHZ OOK transmitter that is connected to remote antenna coil 106.

Figure 4:
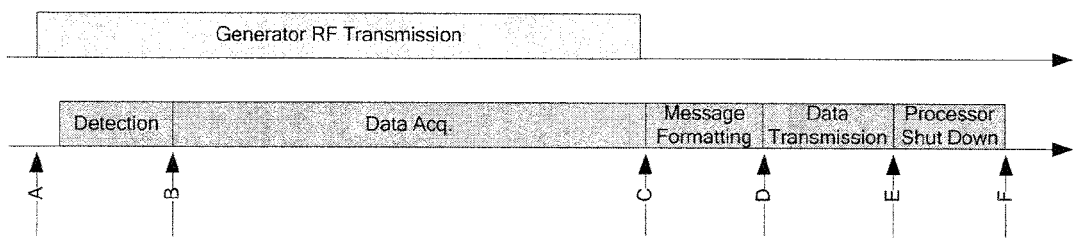
FIG. 4 is a timing diagram for the data acquisition cycle.

The sequencing of the charging and data acquisition cycle referred to above is shown in FIG. 4. Each cycle starts when the external power for power supply 202 is turned on. When power flows to power supply 202, power tap 204 delivers power to all the circuits of master unit 102. In addition, line 206 is driven to a high voltage (+28V), which is interpreted by the CW transmitter 208 as a signal to start transmitting RF for power transfer via master antenna 104. This is shown as event A in FIG. 4.

As soon as master antenna coil 104 starts transmitting, remote antenna coil 106 receives power by electromagnetic parasitic power transfer and charges capacitors in energy harvesting unit 302. Once the capacitors are sufficiently charged, energy harvesting unit 302 starts delivering power at 1.8 VDC to the circuits of remote unit 108, including processor 306. In the described embodiment, processor 306 consumes about 80 microwatts. Once processor 306 has started up, its driving oscillator has settled and it has configured its input/output ports and peripherals, the processor enters the detection phase. In this phase, the processor checks that the remote unit is still receiving RF, i.e., that the received generator transmission corresponds to a genuine data collection cycle, and not to interference or some other transient RF signal. If the processor finds that RF is no longer being received, it skips the data acquisition cycle and proceeds to shut itself down. If, on the other hand, RF is still being received, the processor determines that a genuine data capture cycle can begin, and the data acquisition phase starts, shown as event B in FIG. 4.

During the data acquisition phase, processor 306 acquires sensor data from sensor 304. For sensors that output analog data, the processor performs analog to digital conversion of the sensor signals while reading in and storing the data. For digital sensors, processor 306 manages signal timing and reading of the digital input port. Data acquisition continues for as long as the remote unit receives RF transmission from the master unit. At point C, when the processor detects that the energy received by the harvesting unit drops below a predetermined level, it stops acquiring data and starts formatting a message containing the data (event C in FIG. 4). Formatting includes labeling, error checking and adding other information that may be needed to make up a complete message to be transmitted back to the master unit.

When message formatting is complete, shown as event D in FIG. 4, the processor transmits the message containing the acquired data via remote unit transmitter 308 and remote antenna 106. To save cost and power consumption, the system operates in simplex mode, allowing only one transmitter on the frequency band at a time. Since the master unit is no longer transmitting, the remote unit can transmit its data back to the master unit at the same frequency as the RF power transmission, which is 13.56 MHz. When transmission is complete, shown as event E in FIG. 4, the processor puts itself into a stable state, prepares itself for the next transmission from the master unit, and shuts down.

Since no power is received by remote unit 108 after the generator RF transmission stops, the remote unit must store enough energy during the detection and data acquisition phases to power the message formatting, data transmission, and receiver shut-down phases. For a given electronics package in remote unit 108 (i.e., sensor 304, processor 306, and transmitter 308), this requirement places constraints on the minimum transfer of electromagnetic power to the remote unit, and on the energy storage capacity of energy harvesting unit 302.

Remote unit processor 306 includes firmware that implements an event-driven finite state machine. The state machine has five states that occur in a fixed sequence: detection, data acquisition, message formatting, data transmission, and shutdown. Remote unit 108 recognizes two states of master unit 102: an "on" state corresponding to coupled RF activity above a high, "power-on" level; and "off" state corresponding to coupled RF activity below a low, "power-off" level. The master unit controls the start-up of the remote unit's state machine via the state of the master unit's activity, i.e., turning on the generator RF power at master antenna 106 causes the remote unit to start up; turning off the generator RF power causes the state machine to exit the data acquisition state and move into the message formatting state.

Figure 5:
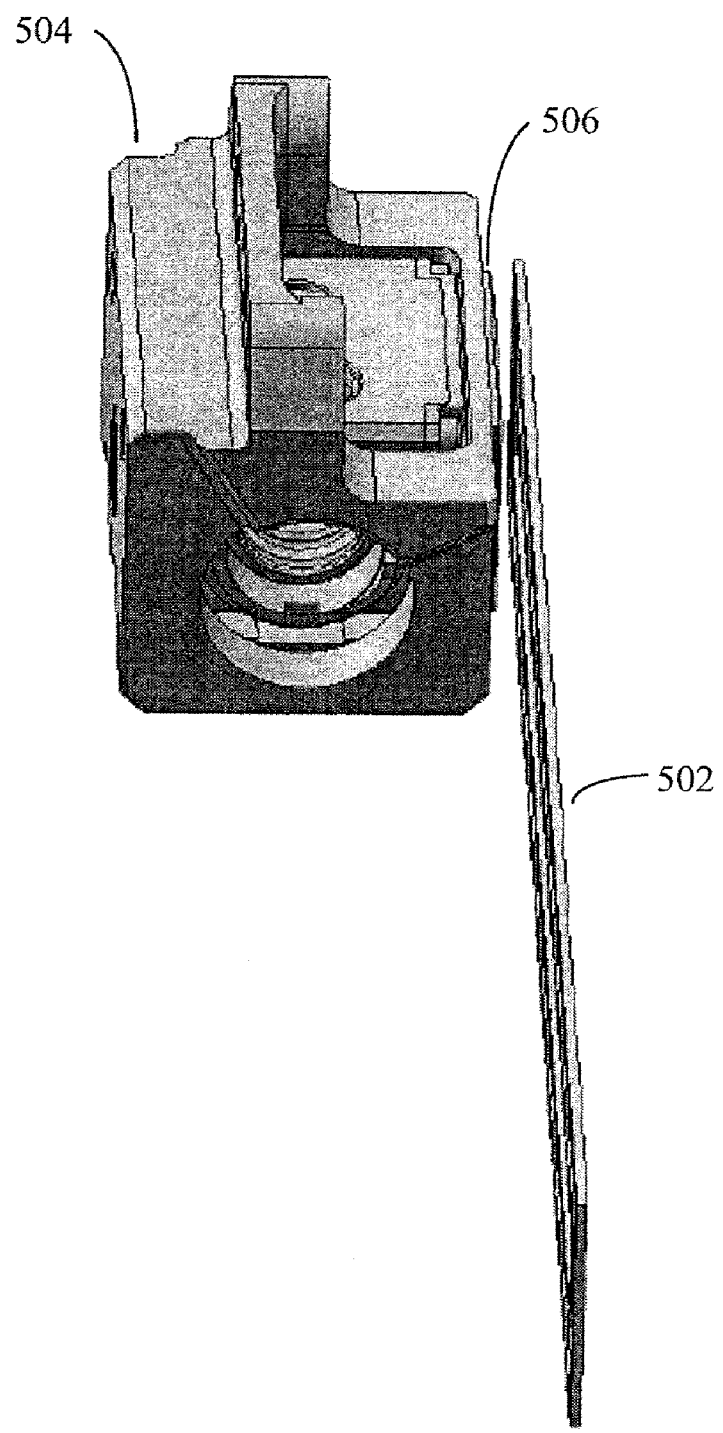
FIG. 5 is an illustration of a ball jack assembly that includes a wirelessly powered remote unit.

We now describe the application of the described embodiment to the monitoring of the condition of a ball screw assembly, such as that illustrated in FIG. 5. Ball screw assemblies are widely used to convert rotational motion to linear motion in applications where accuracy and reliability are required. One such application is in the control of flaps in aircraft, where a motor fixed to a wing strut drives a jack screw along which a ball jack moves back and forth. The ball jack is connected to the flap, and the flap position is controlled by driving a motor that rotates the jack screw. Since reliable flap control is critical for aircraft safety, it is important to be able to monitor the performance of the ball screw. However, since the ball jack is a moving part, it is not easy to connect power to it by means of a wired connection. It is therefore advantageous to supply power to a condition monitoring system within the ball jack assembly using the wireless power transfer techniques described above.

FIG. 5 is an illustration of a ball screw assembly equipped with a condition monitoring unit powered by wireless energy transfer, showing master antenna 502, ball jack 504, and ball screw assembly antenna 506. A master unit (not shown) that includes a power supply, transmitter, receiver, and processor arranged as shown in FIG. 2 is connected to the jack screw drive motor (not shown) and is mounted on the aircraft wing. When the flap motor power is turned on, the master unit transmitter starts sending RF for wireless electromagnetic power transfer from master unit antenna 502. Antenna 502 is mounted on the spar of an aircraft wing (not shown) adjacent to the jack screw, and has an elongated shape with its long dimension corresponding to the range of motion of ball jack 504 up and down the jack screw (not shown). The range of motion depends on the type of aircraft, and ranges from about 20 inches in smaller aircraft to about 36 inches in larger aircraft.

Ball screw antenna 506 is mounted on the side of the ball jack assembly facing the master unit antenna. Master antenna 502 has an elongated shape, with its long dimension running parallel to the jack screw. This arrangement ensures that the gap between it and remote unit antenna 506 does not change appreciably as ball jack 504 moves up and down the jack screw. As a result, remote unit antenna 506 maintains consistent electromagnetic coupling with master unit antenna 502 throughout its range of motion. Consistent coupling is needed both to provide adequate power to the electronics housed within the ball jack assembly, as well as to prevent false responses by the ball jack's receiver. For example, if at some point during the motion of the ball screw the coupled power drops below a level corresponding to the predetermined "power-off" level, the remote unit in the ball jack assembly would interpret this as the signal to stop acquiring data and would prematurely terminate data acquisition. The gap between master antenna 502 and ball screw antenna 506 is about ¼ inch or less.

One important measure of the condition of a ball screw assembly is the rate at which ball bearings move within the assembly ball path housings as a function of the screw's angular speed. A change in this rate can indicate wear in the bearing, alerting technicians that the bearing needs to be serviced or replaced. In order to monitor ball bearing movement, ball jack 504 includes embedded sensors (not shown), each sensor detecting the passage of ball bearings past a particular point within one of ball paths. Also housed within ball jack assembly 504 are an energy harvesting unit that receives power from antenna 506 and powers all the remote circuits, a processor connected to the sensor, and a transmitter connected to the processor. The arrangement of components of the electronics package housed within the ball jack assembly corresponds to that of the remote unit shown in FIG. 3.

When the flap motor power is turned on to move the flap, the data acquisition cycle shown in FIG. 4 starts. If the ball jack's processor detects non-transient RF activity in coil 506, it moves into a data acquisition state, acquiring ball movement data from the sensor. When the flap motor power is turned off (i.e., the flap has reached its desired position), master antenna 506 stops transmitting CW RF, and the ball jack assembly's processor detects the cessation of the RF activity in coil 506. It then stops acquiring data and starts formatting the acquired data into a message. After it has formatted a message containing the measured ball bearing movement data, the processor forwards the message to the ball screw assembly's transmitter, which in turn converts the message into an RF signal that is transmitted wirelessly via ball screw assembly antenna 506 to master antenna 502. The master unit receiver detects the message, passes it to the master unit processor, which can either process the message locally, or cause the message to be stored for later analysis.

The techniques described above can broadly be applied to the monitoring or gathering of data from any module that cannot easily be fitted with wires, slip rings, brushes, or other physical power connections. This situation often arises when the module moves relative to its surroundings. In addition to the ball screw assembly application described above, another example is the measuring of the vibration of a turning shaft, in which the wirelessly powered unit includes an accelerometer or strain gauge mounted on the shaft. Examples of such shafts include gear and transmission shafts in ships.

Variations of the techniques described above include using a single master unit to transfer power to multiple wireless data-gathering units. This requires the use of a multiple access protocol, such as the "Slotted Aloha" protocol promulgated by Intel Corporation. This protocol involves the use of timing slots, with each remote unit being assigned a particular time slot in which to transmit its data back to the master unit. Another technique requires the master unit to broadcast the address of a selected remote unit, causing the selected remote unit to transmit its data back to the master unit.

An application that uses a single master unit to transfer power to multiple remote units and to receive data back from each of them is the measurement of temperature and pressure in aircraft wheels. Most commercial aircraft have more than one wheel on each wheel strut. A master unit mounted to the wheel strut adjacent to the wheels communicates wirelessly with parasitically charged remote modules housed within each of the wheels.

Other embodiments include separating the signal to start the remote unit data acquisition cycle from the onset of RF power transmission from the master unit's generator antenna. In order to accomplish this, the master unit is equipped with its own OOK transmitter, and can issue an instruction via antenna 104 to start the monitoring at an arbitrary time, or upon the occurrence of an event or condition detected by the master unit or by the remote unit. Similarly, the termination of a data acquisition phase can be decoupled from the cessation of CW RF broadcasts, and can occur at an arbitrary time, including a time associated with an event or condition occurring either at the master unit or at the remote unit. The data transmissions from the parasitically powered remote unit can be received by one or more units other than the master unit that transmits the power. Remote unit transmitter 308 and corresponding master unit receiver 210 can be FM modulated units, which increases cost but reduces the risk of interference. Any modulation scheme can be used for the data transmission, though for commercial applications, complying with regulatory requirements of the frequency band being used limits the options. The transmitter/receiver can use frequencies other than 13.56 MHz, including 135 KHz, 6.78 MHz, 27.125 MHz, 915 MHz, 5.8 GHz, 24.1 GHz, and others that are permitted in the jurisdiction where the unit is to be operated. In systems having multiple remote, parasitically powered units, the master unit can use a different transmit/receive frequency to communicate with each of the remote units. In addition to adding header and messaging information and checking for errors, remote processor 306 can add error correcting information to the data message, as well as perform other processing tasks. Such tasks can include data manipulation, such as computing an average value of the data collected during a data acquisition cycle, and calibrating or correcting the acquired data based on a locally measured parameter, such as temperature.

Other embodiments are within the following claims.

What is claimed is:

1. A wireless system comprising:
a unit which travels back and forth over a path during operation; and
a first antenna having an elongated shape and which lies adjacent to and along the path over which the unit travels during operation,
wherein the unit comprises:
a second antenna;
an electrical energy storage unit connected to the second antenna, wherein during operation the energy storage unit receives energy via electromagnetic coupling of the second antenna with an RF field produced by the first antenna, at least a part of the received energy being stored in the energy storage unit; and
an electronics system connected to the energy storage unit and which during operation is powered solely by the received energy stored in the energy storage unit, the electronics system including a sensor, a processor configured to acquire data from the sensor, and a transmitter coupled to the processor and to the second antenna, wherein the energy storage unit is capable of storing sufficient energy received from the RF field produced by the first antenna to enable the transmitter to transmit a message wirelessly via the second antenna, the message containing data acquired by the processor from the sensor.

2. The wireless system of claim 1, wherein the energy storage unit is capable of storing sufficient energy to further power the processor to perform at least one of the functions of acquiring data from the sensor, formatting a message containing data acquired from the sensor, and shutting the processor down.

3. The wireless system of claim 2 wherein the sensor is an analog sensor.

4. The wireless system of claim 1, wherein the processor includes instructions in firmware, the instructions for implementing a finite state machine when executed on the processor.

5. The wireless system of claim 4, wherein the finite state machine includes a data acquisition state, and a data transmission state.

6. The wireless system of claim 5, wherein the state machine further includes at least one of an RF detection state, a message formatting state, and a system shut-down state.

7. The wireless system of claim 5, wherein the instructions cause the finite state machine to enter the data acquisition state when a level of RF activity in the antenna exceeds a predetermined power-on level.

8. The wireless system of claim 5, wherein the instructions cause the finite state machine to exit the data acquisition state when a level of RF activity in the antenna falls below a predetermined power-off level.

9. The wireless system of claim 1, wherein the path is a straight line path, the first antenna having a length approximately equal to the length of the straight line path.

10. The wireless system of claim 1, wherein the transmitter uses at least one of on-off keying modulation and frequency modulation.

11. The wireless system of claim 1, wherein the unit further comprises a receiver connected to the processor, the receiver being powered by the energy storage unit, the receiver being capable of receiving RF transmitted instructions for execution on the processor.

12. The wireless system of claim 1, wherein the first antenna is parallel to the path over which the unit travels during operation.

13. The wireless system of claim 1, further comprising a first structural element on which the unit is mounted and a second structural element on which the first antenna is mounted and which moves relative to the first structural element.

14. The wireless system of claim 13, wherein the first structural element during operation moves relative to the second structural element.

15. The wireless system of claim 14, further comprising a motor mounted on the second structural element which during operation causes the first structural element to move relative to the second structural element.

16. The wireless system of claim 1, wherein the unit comprises a ball jack.

17. The wireless system of claim 1, further comprising a master electronics system connected to the first antenna and capable of generating an RF field via the first antenna.

18. The wireless system of claim 17, wherein the master electronics system includes a transmitter, a receiver, and a processor.

19. The wireless system of claim 1, wherein the unit and the first antenna are configured such that the first antenna moves parallel to and along the second antenna when the unit travels back and forth over said path.

* * * * *